Jan. 3, 1939.     W. ILBERG     2,142,192
MODULATION SYSTEM FOR MAGNETRON OSCILLATORS
Filed March 13, 1935

INVENTOR.
WALDEMAR ILBERG
BY
ATTORNEY.

Patented Jan. 3, 1939

2,142,192

UNITED STATES PATENT OFFICE 2,142,192

MODULATION SYSTEM FOR MAGNETRON OSCILLATORS

Waldemar Ilberg, Berlin, Germany, assignor to Telefunken Gesellschaft für Drahtlose Telegraphie m. b. H., Berlin, Germany, a corporation of Germany Application March 13, 1935, Serial No. 10,798
In Germany April 3, 1934

4 Claims. (Cl. 179—171)

The present invention relates to a system adapted to the modulation of oscillations or waves generated by the aid of a magnetron arrangement.

What is here meant by a magnetron is a device in which an electron discharge takes place subject to the influence of a magnetic field. Magnetron tubes of conventional design contain a straight hot cathode, which is disposed axially inside a cylindrical anode or plate split or built up of metallic segments, though the plate could consist also of planar plates positioned radially in reference to the cathode. Between the plate and the cathode, or else between two segments of the plate, a resonant system is connected. This may be a so-called Lecher system (consisting of parallel wires), which, on the one hand, serves to stabilize the oscillations generated inside the tube and, on the other hand, serves for the output or delivery of the oscillatory energy. The electronic discharge is subject to the action of a magnetic field which, as a general rule, is directed at right angles to the discharge path, the said magnetic field being set up either by a permanent magnet or else by a field coil (solenoid). The modulation of the waves generated in this arrangement, according to the methods disclosed in the prior art, is effected in such manner that either the intensity of the magnetic field, or else the voltage applied to the plate or to a segment thereof, is varied at the rhythm or rate of the modulation process. However, schemes of this kind have the drawback that, on the one hand, a considerable modulation power is consumed, if the magnetic field (which is markedly inductive) was to be controlled to a high degree, and that, on the other hand, any change in field intensity or plate potential was absolutely associated with an influence on the frequency of the ensuing oscillations. The object of the present invention resides in a modulation method in which such shortcomings as have hereinbefore been enumerated are obviated, while in addition the same distinguishes itself by extremely great simplicity.

Figure 1:
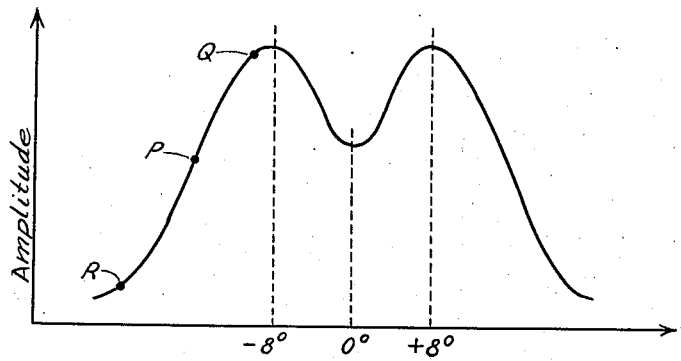
Fig. 1 is a curve showing the relation between the amplitude of the wave and the angular position between the magnetic field and filament.

According to this invention, modulation of the oscillations produced in a magnetron arrangement is insured by altering the direction or orientation of the magnetic field brought to act upon the discharge path. In fact, the invention is predicated upon the observation that the intensity of the oscillations produced by a magnetron arrangement is highly dependent upon the orientation of the magnetic field in reference to the axis of the filament. But, it is solely in the presence of certain circumstances that, in this connection, maximum oscillation intensity is realizable, i. e., when the lines of force of the magnetic field are parallel to the axis of the filament; in other words, when the angle between them is zero. As a general rule, these conditions which reside in a definite relation between magnetic field intensity, plate voltage, and geometric data of the tube, will not be satisfied. In fact, what is then found is a typical relationship as graphically illustrated in Fig. 1. Maximum radio frequency amplitude in such a case will not be obtained in the presence of a zero angle, but rather in the presence of a certain finite positive or negative angle between magnetic field and filament; the angle, in the example illustrated in the graph, having been assumed to amount to 8°. Inasmuch as this is the more general case, it will be used as a basis in what follows, and it comprises the case first mentioned as a special case. The dependence of the oscillatory energy upon the said angle of inclination between magnetic field and cathode is very great. In fact, a comparatively slight alteration of this angle may result in a considerable decrease in oscillation energy. According to the present invention, this relationship or inter-dependence is utilized for the purpose of producing modulation in magnetron waves.

Figure 2:
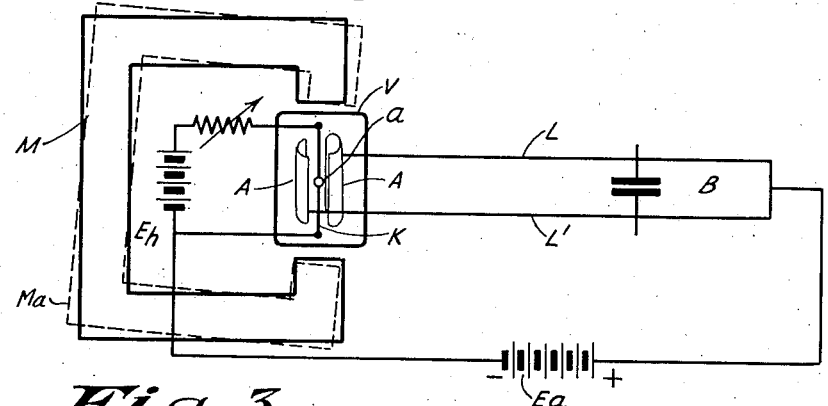
Fig. 2 shows one means for varying the position of the field with respect to the cathode.

In the simplest instance, the said modulation would be brought about by virtue of mechanical motion of the magnet proper, in that the magnet may be caused to pivot about a point or axis positioned at right angles to the filament. Indeed, in this manner slow modulation of the energy may readily be accomplished. It is moreover conceivable to set up vibrations in the magnet, or the solenoid or field coil serving for the production of the magnetic field, and to thus produce a modulation of the vibrations in audio frequency rhythm. One exemplified embodiment predicated upon this idea is indicated in Fig. 2. The magnetron tube V also contains a cathode K and an anode consisting of two segments A. Connected with the two anodes is the parallel wire or Lecher system L, L' which, by the agency of the short-circuiting bar or capacitor B, is tunable to the frequency of the ensuing waves. The cathode is fed from a source of filament potential E$h$, while the plate voltage is derived from a source of voltage indicated at E$a$. The magnetic field, by way of example, is set up by a permanent magnet of the horseshoe pattern M. If the latter is turned slightly about an axis or pivot $a$ positioned at right angles to the cathode K, as shown by the broken line representation M$a$ in Fig. 2, the direction of the magnetic field cutting across the discharge path will be altered in a similar way, and the oscillation power delivered by the tube will be correspondingly modulated. The modulating means for causing the magnetic field producing member M to be vibrated has not been shown in the drawing because it may well be understood by those skilled in the art that where any mechanical vibration of such a member is required in response to low frequency waves such as audio waves, the method of transmission of the electrical wave energy of the mechanical vibrations can readily be accomplished. The principle involved is nothing more nor less than that of attaching an armature to some portion of the member which is to be vibrated on its pivot and then causing such an armature to react in response to variations in a magnetic field produced by an inductive coil which in turn is traversed by modulation currents. In this case what is desired is that the pivoted member M shall not of itself be varied in magnetic flux density but only that it shall be wobbled about its axis. Therefore, the variations in magnetic flux which are produced by the modulating circuit must be so positioned as to cause a mechanical vibration of the member M, while the magnetic flux density which traverses the tube V remains constant.

However, in a far more perfect manner, a change of direction in the magnetic field brought to act upon the discharge path is insurable by the use of an additional magnetic field, preferably placed at right angles to the existing magnetic field M, the latter being permanently set up practically parallel to the cathode. These two magnetic fields are vectorially composed to give a resultant field whose direction in reference to the cathode is a function of the intensity of the auxiliary field.

Figure 3:
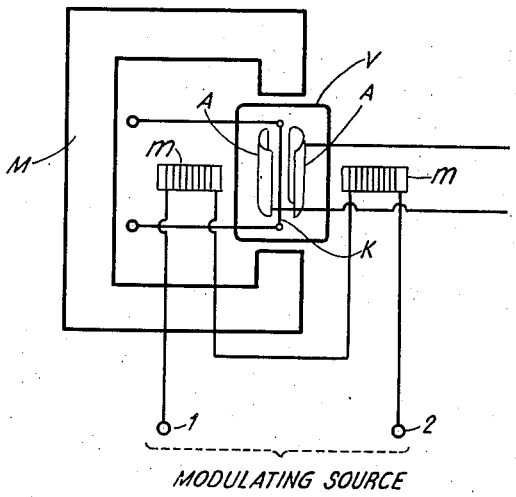
Fig. 3 shows another arrangement for obtaining the result.
Figure 3A:
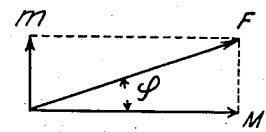
Fig. 3a is a diagrammatic showing of the resultant field obtained by the use of the apparatus of Fig. 3.

This situation is illustrated more clearly in Fig. 3. Referring to this figure, the magnetron tube V again is shown comprising a cathode K as well as an anode consisting of two segments A. The main magnetic field is here generated by a permanent magnet M. The elements or means connected exteriorly with the cathode and the anodes, and which may be similar to those shown in Fig. 2, have been here omitted for the sake of clarity of illustration. Upon both sides of the tube are connected auxiliary magnets $m$ whose field is placed at right angles to the cathode. The windings of these magnets, for instance, are connected in series and are united with the terminals 1, 2, across which the modulation potential is applied. The fields set up by the chief magnet M, and the auxiliary magnets $m$, as shown in Fig. 3$a$, vectorially result in a resultant field F. It can be readily seen that the angle $\varphi$ between the direction of the main field M and of the resultant field F changes whenever the intensity of the auxiliary field increases or decreases. Inasmuch as the amount of change in the angle of inclination required in the resultant field, in reference to the cathode, to insure complete modulation of the oscillatory energy amounts to only a few degrees, it will be seen that extremely slight alterations in the intensity of the auxiliary field will suffice. For instance, the ratio between the intensity of the auxiliary field $m$ and the intensity of the chief field M may be as 1:1000. What follows therefrom, on the one hand, is that the amount of the resultant field vector F may be considered as practically constant so that the modulation acts merely upon the amplitudes, but not the frequencies of the ensuing oscillations; while, on the other hand, complete modulation of the oscillation energy is feasible with an extremely small expenditure of modulation power.

The arrangement schematically shown in Fig. 3, of course, is merely typical of a great many different modifications which may be adopted without departing from the spirit and scope of this invention. For example, a single auxiliary magnet $m$ may be employed, or else the windings of the two auxiliary magnets could be connected in parallel. If, upon the energizing current of the auxiliary magnets $m$ a regulable direct current is superposed, it is possible, in a simple manner, to adjust the position of rest or inactivity of the ensuing magnetic field to the optimum value in any given instance. It is possible to place the working point either in the middle of the practically straight part of the curve shown in Fig. 1 (point P), in order that modulation may be insurable about a mean or average value, or else in the neighborhood of the upper or lower knee (see points Q and R), if modulation is to take place from zero to "top", or vice versa.

A suitable form of construction of such an arrangement results if the auxiliary magnetizing windings are secured directly upon the vacuum vessel of the magnetron tube or else upon a sleeve acting as a bobbin and surrounding the tube axially. In order to diminish reluctance, the lines of force may be closed or looped by the aid of a yoke exteriorly disposed.

What is claimed is:

1. Apparatus for producing modulated oscillations comprising an electron discharge tube of the magnetron type, said tube having a plurality of anode segments and a coaxial linear cathode, means for setting up lines of magnetic force within said tube in a direction substantially parallel to the cathode axis of said tube and means mechanically exerted under control of a source of modulating energy for producing slight deviations from the parallel relationship between said lines of force and said cathode axis.

2. In an oscillation generator of the magnetron type, a magnetron discharge tube having a coaxial arrangement of a linear cathode surrounded by a plurality of segmented anodes, apparatus for producing a magnetic field amidst the zone of electron discharge in said generator, the axis of said field and the electrode axis of said generator being normally co-incident, a source of modulating energy and means mechanically operative in accordance with variations in said modulating energy for angularly wobbling the field axis through a slight angle in relation to the electrode axis.

3. A device in accordance with claim 2 and having the magnetic field producing apparatus constituted by a magnetizing member pivoted substantially at right angles to the electrode axis of the generator.

4. In a magnetron system of the class described, means for generating oscillations comprising an electron discharge device having a linear cathode and a plurality of segmented anodes surrounding said cathode, all within a single envelope, means for normally maintaining a magnetic field with its lines of force traversing the zone of electron discharge between the cathode and anodes in a direction substantially perpendicular to the lines of flight of electrons projected radially from said cathode toward said segmented anodes and means under control of a source of modulating energy for mechanically wobbling the orientation of said magnetic field through an acute angle with respect to the linear axis of said cathode, thereby to modulate said oscillations.

WALDEMAR ILBERG.